United States Patent [19]
Kanda

[11] 4,092,856
[45] June 6, 1978

[54] KILOBAR RANGE STRESS GAUGE
[75] Inventor: Richard Kanda, Vicksburg, Miss.
[73] Assignee: The United States of America as represented by the Secretary of the Army, Washington, D.C.
[21] Appl. No.: 796,649
[22] Filed: May 13, 1977
[51] Int. Cl.² ............................................. G01L 7/02
[52] U.S. Cl. .................................. 73/141 A; 73/88 E
[58] Field of Search .................... 73/141 A, 84, 88 E, 73/398 AR

[56] References Cited
U.S. PATENT DOCUMENTS
3,696,317 10/1972 Farr ............................... 73/141 A X
3,869,906 3/1975 Andersson ......................... 73/141 A Primary Examiner—Jerry W. Myracle
Attorney, Agent, or Firm—Thomas O. Maser

[57] ABSTRACT

A free field stress gauge capable of dynamic and static response in the kilobar (nominally 15,000 p.s.i.) range is disclosed. A first embodiment of the stress gauge of this invention comprises two circular plates, one of which is concentrically grooved. The other plate of the two circular plates serves as a cover plate. Strain gauge sensors are mounted on the inner ring or tube of the concentrically grooved plate. These sensors measure strains of the inner ring or tube induced by and proportional to stresses applied to the flat faces of the gauge. The second embodiment which operates in the same manner as the first embodiment is a solid column type of stress gauge.

9 Claims, 5 Drawing Figures

KILOBAR RANGE STRESS GAUGE

The invention described herein may be manufactured, used, and licensed by or for the Government for Governmental purposes without the payment to me of any royalties thereon.

BACKGROUND OF THE INVENTION

This invention relates to stress gauges, and more particularly to free field stress gauges capable of dynamic or static responses up to and including the kilobar (nominally 15,000 p.s.i.) range.

Free field stress gauges as defined herein are gauges that are designed to be physically imbedded in or surrounded by a given body of material (medium) and are used to provide a measurement of any stress in the medium in which they are being used. Load cells, on the other hand, which are common well known stress gauges are generally used to measure the force generated by or the weight of a given body. Further, the physical properties of a load cell may be independent of the medium of interest, which is not true for an ideal free field stress gauge.

An ideal free field stress gauge has the same deformation and density characteristics as the surrounding medium. Furthermore, the gauge should have constant deformation characteristics across its entire face. If these conditions do not exist and the density and deformation characteristics of the stress gauge are allowed to vary in an uncontrolled manner, the stress gauge, especially in the dynamic free field mode, could disrupt the internal stress field of the medium to such an extent that data generated by the gauge would be erroneous. If significant density mismatch occurs, dynamic response of the stress guage and surrounding medium will differ and the gauge output will suffer. Similarly, if the stiffness or resistance to deformation (Modulus) of the stress gauge is less than that of the medium, the indicated or measured stress would be less than the true stress in the medium. The converse is also true, particularly in granular soil and rock media.

An ideal free field stress gauge should also have uniaxial sensitivity. It should sense stress in only one direction. This is required because materials which possess shear strength will have, under certain conditions of multicomponent loading, an internal stress distribution which is not equal in all directions. The only way to observe the actual internal state of stress for such a material in such a loading condition would be to embed a multiplicity of uniaxial stress gauges into the material in such a way that their sensitive axes were oriented in different directions.

The invention provides a free field stress gauge that is so designed that effective control of gauge density (weight per unit volume) and deformation (modulus) is provided. Uniaxial sensitivity is also achieved. Further, this invention provides a free field stress gauge suitable for use in stress fields up to and including the kilobar range.

SUMMARY OF THE INVENTION

A free field stress gauge designed for use in the Kilobar (nominally 15,000 p.s.i.) range is disclosed. The first embodiment of the invention comprises two circular discs, one of which is the active disc and the other of which serves as a cover plate. The active disc contains a plurality of concentric grooves and the cover disc is secured to the concentrically grooved active disc by means of an epoxy glue, for example. Since the active disc is concentrically grooved, a series of rings or tubes are formed in the active disc. A plurality of strain sensors are mounted on the inner ring or tube. Electrical leads are connected to the strain sensors and these leads are brought out of the stress gauge to provide electrical communication with the strain sensors. A suitable measuring device, such as a meter, is connected to the electrical leads on the outside of the stress gauge to provide a visual indication of the stress being applied to the stress gauge and, therefor, to the medium surrounding the stress gauge. By proper choice of materials and by the proper selection of the number and size of the grooves, the stress gauge can be tailored to match the density and modulus (deformation) of the surrounding medium. Therefore, the stress measurements obtained with the grooved stress or tubular stress gauge of this invention are accurate measurements of the stress being applied to the surrounding medium. Further, uniaxial sensitivity of this invention is achieved by the physical isolation of the inner ring or tube from loads not perpendicular to the disc faces by the outer rings or tubes of the active and cover discs.

A second embodiment of the invention, which is a modification of the first or basic embodiment, is also disclosed. The second embodiment is a column type stress gauge or transducer, whereas the first embodiment is a tubular or grooved type stress gauge or transducer. However, the second embodiment operates in the same manner as the first embodiment and provides accurate measurements of the stress being applied to the surrounding medium. The stress gauge or transducer of the second embodiment also includes a cover disc and an active disc with the strain sensors being mounted on the innermost column of the active disc.

BRIEF DESCRIPTION OF THE DRAWING

A complete understanding of the structural details and operation of the invention can be obtained from the following detailed description when read in conjunction with the annexed drawing in which.

DETAILED DESCRIPTION OF THE INVENTION

Figure 1:
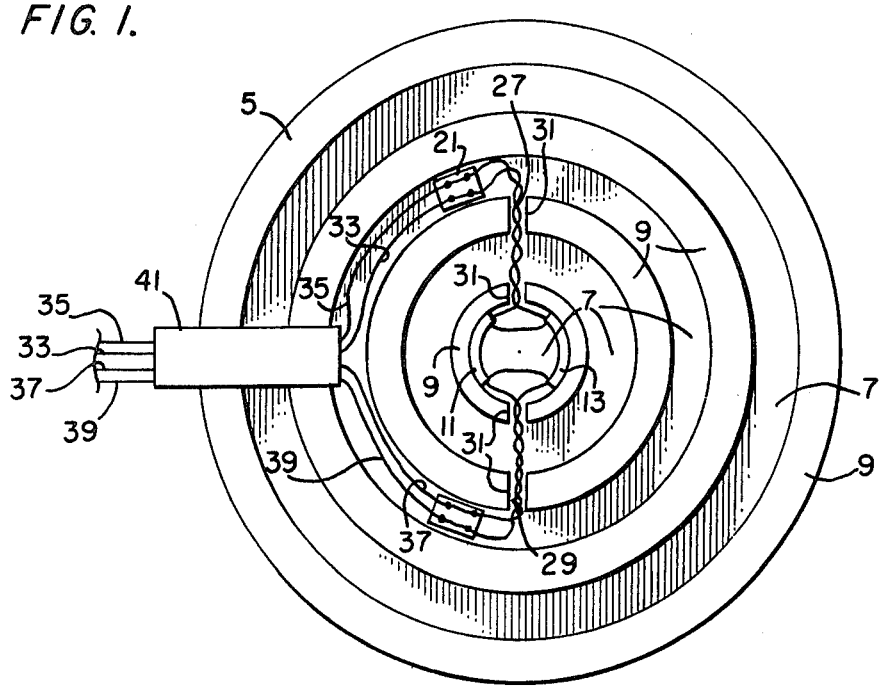
FIG. 1 is a top view of the first embodiment of the invention with the cover disc removed.
Figure 2:
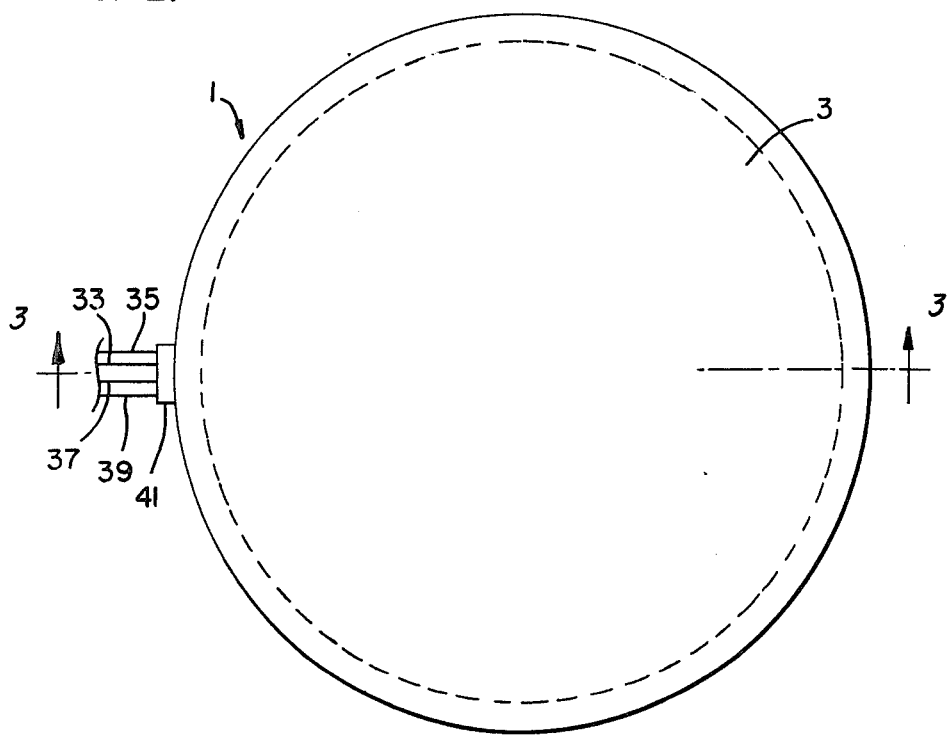
FIG. 2 is a top view of the first embodiment with the cover disc in place.
Figure 3:
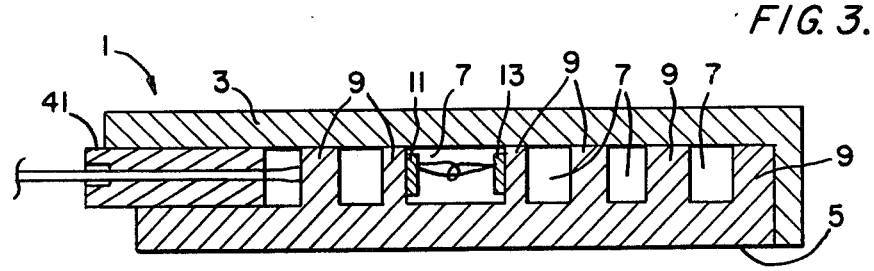
FIG. 3 is a cross-section view of the first embodiment of the invention taken along the line 3—3 of FIG. 2.

Referring to the drawing and more particularly to FIGS. 1, 2 and 3 thereof, the first embodiment of the stress gauge or transducer 1 of the invention comprises an active disc 5 and a cover disc 3. The sensitive axis of the stress gauge is perpendicular to the flat faces of the discs. As shown in FIGS. 1 and 3, a plurality of grooves 7 are cut into active disc 5. Thus, a series or plurality of tubes or rings 9 are formed in active disc 5. Cover disc 3 is secured to active disc 5 by means of an epoxy cement or the like.

Figure 4:
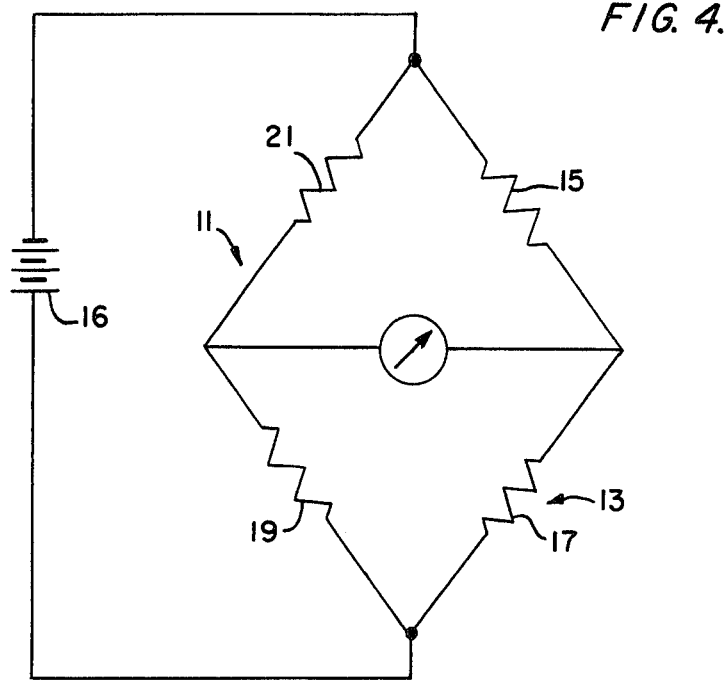
FIG. 4 is a schematic diagram of the sensor circuitry of the invention.

The strain sensor assemblies 11 and 13 are mounted on the inner tube or ring 9. However, strain sensors could be mounted on any or all of the tubes or rings 9 without changing the operational principle of stress gauge 1. Strain sensor assemblies 11 and 13 each include two strain sensors; the sensors 15, 17, 19 and 21 shown in FIG. 4. As shown in FIG. 4, sensors 15, 17, 19 and 21 are connected together to form a Wheatstone bridge which, when coupled to an appropriate power source 16, provides a commonly known measuring apparatus.

Referring back to FIG. 1, strain sensor assemblies 11 and 13 are electrically connected to the terminal blocks or tabs 21 and 25 by means of the pairs of electrical conductors 27 and 29, respectively. The slots 31 are cut into the two innermost rings 9 and electrical conductor pairs 27 and 29 are brought out from the strain sensor assemblies 11 and 13 to terminal tabs 21 and 25 through these slots. The electrical conductors 33 and 35 are each electrically connected to a different one of the two conductors of electrical conductor pair 27 through terminal tab 21 and the electrical conductors 37 and 39 are each electrically connected to a different one of the two conductors of electrical conductor pair 29 through terminal tab 25. Conductors 33, 35, 37 and 39 are brought out of active disc 5 through the conduit or sheath 41. Slots not clearly visible in the drawing are cut into the outermost rings 9 of active disc 5 and the cover disc 3 and conduit or sheath 41 rests or is secured into these slots. The foregoing described wiring arrangement for providing electrical communication of the strain sensor assemblies 11 and 13 to the outside of stress gauge or transducer 1 is an obviously convenient arrangement and represents a preferred wiring arrangement. However, other wiring arrangements could obviously be utilized as will be apparent to those skilled in the art. For example, two wire cables could be used throughout and the terminal blocks or tabs 21 and 25 could be eliminated.

Stress gauge or transducer 1 shown in FIGS. 1, 2 and 3 is designed for use as a free field stress gauge operating in the kilobar range. After active disc 5 has been appropriately grooved, and strain sensor assemblies 11 and 13 have been mounted on the inner ring or tab and electrically wired, and cover disc 3 has been secured to active disc 5, stress gauge or transducer 1 is ready for use. In use, stress gauge or transducer 1 is buried in or surrounded by the medium of interest. That is, stress gauge or transducer 1 is used to sense and provide a measurement of the stress or pressure being applied to the medium surrounding gauge 1. When a stress is applied to the medium surrounding stress gauge or transducer 1, this stress is transmitted to stress gauge 1 and as long as the actual stress imposed on the inner ring or tube is less than the yield strength of the material of which this ring is composed, the deformation measured by the strain sensors 15, 17, 19 and 21 will be direct function of the stress applied to the medium surrounding gauge or transducer 1. Two of the strain sensors 15, 17, 19 and 21 measure longitudinal deformation and the other two measure circumferential deformation. These deformations are a direct function of the load and hence of the stress applied to the flat faces of stress gauge 1. A suitable measuring device such as a meter is connected to the appropriate conductor 33, 35, 37 and 39 to provide a visual indication of the stress being applied to the medium surrounding stress gauge 1. This meter could, of course, be a chart type meter so that a continuous permanent record of the stress can be obtained.

A free field stress gauge such as stress gauge 1 will provide accurate measurements of the stress being applied to the medium surrounding stress gauge 1 if the density (weight per unit volume) and the deformation (modulus) of the stress gauge 1 match the density and modulus of the surrounding medium. The design of stress gauge 1 permits one to match the medium modulus and density so that accurate measurements of the stress being applied to the surrounding medium can be obtained with stress gauge 1.

By providing grooved active disc 5 in conjunction with a proper choice of material, stress gauge 1 can be tailored to match the density and modulus of the material with which it is to be used. The density and modulus matching is accomplished by selecting the appropriate material and by providing an appropriate number of grooves. That is, after selecting the proper material, one provides the proper number of grooves in active disc 5 to obtain a density and modulus match. Thus, the number of grooves 7 and, therefore, the number of tubes or rings 9 shown in FIGS. 1 and 3 may not be the exact number provided for a given gauge. This number will vary depending upon the material selected and the density and modulus of the material in which that particular gauge will be used. Further, the rings or tubes 9 of the active disc 5 provide support for the flat faces of active disc 5 and cover disc 3. This enables the flat faces to stay much more planar under load than unsupported faces. The gauge deforms more uniformly across its face as desired. In the kilobar range, supported disc faces are required since unsupported disc faces capable of surviving such stresses would be of such a thickness that density mismatch problems would occur. Therefore, this invention permits one to match a free field stress gauge with the medium in which it is to be used in order that accurate measurements will be obtained. The stress gauge responds uniaxially and deforms uniformly. Further, stress gauges designed in accordance with this invention can be used in stress fields up to and including the kilobar range.

Figure 5:
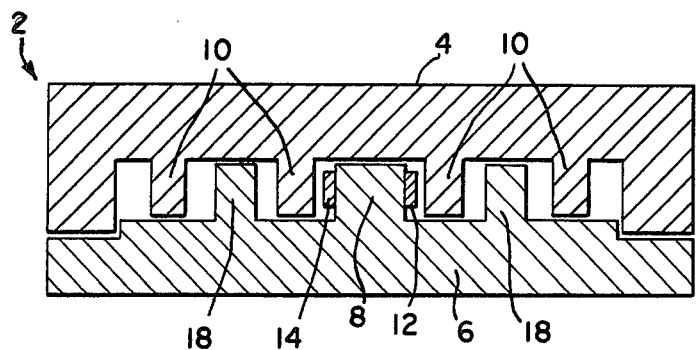
FIG. 5 is a cross-section view of the second embodiment of the invention.

FIG. 5 shows a second embodiment of this invention. This second embodiment is a variation or modification of the above described first embodiment and operates in the same manner as the first embodiment. The stress gauge 2 of FIG. 5 includes a cover disc 4 and an active disc 6. Active disc 6 is also grooved but is grooved in such a manner as to provide a ring 18 and a central column 8. Strain assemblies 12 and 14 identical to strain assemblies 11 and 13 of FIGS. 1, 3 and 4 are mounted on the column 8 of active disc 6. The actual electrical connections and the electrical conductors provided to permit communication with strain sensor assemblies 12 to 14 to the outside of stress gauge 2 are essentially identical to the electrical connections and conductors provided with stress gauge 1 as described above and shown in FIGS. 1 through 4 and, therefore, are not shown in FIG. 5. Further, as was stated above with reference to stress gauge 1, any suitable wiring layout can be used with stress gauge 2 as will be apparent to those skilled in the art.

Cover disc 4 is also grooved to provide a plurality of rings 10. Cover disc 4 is secured to active disc 6 by means of an epoxy cement or the like. The rings 10 of cover disc 4 and the ring 18 and central column 8 of active disc 6 provide support for cover disc 4.

As is the case with stress gauge 1, stress gauge 2 can be tailored to match the density and modulus of the medium in which it is to be used so that accurate measurements will be obtained. The density and modulus of stress gauge 2 is tailored to match the density of a given medium by selecting an appropriate material and by providing a proper number of rings 10 and 18 with given thickness. That is, by varying the number and thickness of the rings 10 and 18 and the diameter of the column 8 in conjunction with the proper choice of material, stress gauge 2 can be designed to have a density and modulus that match the density and modulus of the surrounding medium in which it is to be used. Thus, for different mediums, the number of rings 10 and 18 provided will be different if the same material is used to construct stress gauge 2. If different materials are used to construct two stress gauges 2, the number of rings 10 and 18 provided for two different mediums may or may not be the same, as should be apparent since the density and modulus of stress gauge 2 is dependent upon both the choice of material and the number and thickness of rings 10 and 18 provided. In stress gauge 1, the density and modulus of stress gauge 1 is dependent upon both the choice of materials and the number and thickness of rings or tubes 9. Thus, both stress gauges 1 and 2 can be designed to match the density and modulus of the medium in which a particular one of the stress gauges 1 or 2 is to be used and the number and thickness of rings 9, 10 and 18, and the diameter of column 8, will vary depending upon the material selected for a given stress gauge 1 or 2, respectively, and the medium in which that stress gauge is to be utilized. Stress gauge 2 is characterized by uniaxial response, uniform face deformation and kilobar range capacity as in the case of stress gauge 1.

While two specific embodiments of the invention are shown in the drawings and described in detail herein, it will be obvious to those skilled in the art that various changes and modifications can be made to these two specific embodiments without departing from the spirit and scope of the invention as set forth in the claims.

I claim:

1. A free field stress gauge for use in stress fields up to and including the kilobar range, comprising:
    an active disc having a plurality of elements, the density and modulus of said free field stress gauge being dependent upon the number of said plurality of elements and the material used to construct said free field stress gauge, said plurality of elements comprising a plurality of rings formed in one surface of said active disc, said plurality of rings being formed by cutting a plurality of grooves in one surface of said active disc;
    a cover disc secured to said active disc to cover said active disc; and
    means for sensing any stress applied to said free field stress gauge, said means for sensing any stress applied to said free field stress gauge being mounted on said active disc and comprising a plurality of strain sensors mounted on the inside of the innermost ring of said plurality of rings.

2. A free field stress gauge as defined in claim 1 wherein the number of said plurality of strain sensors is four, two of which sense longitudinal deformation and two of which sense circumferential deformation of said free field stress gauge and wherein means are provided to electrically communicate with said four strain sensors from outside of said free field stress gauge.

3. A free field stress gauge as defined in claim 2 wherein said means to electrically communicate with said four strain sensors is a plurality of electrical conductors that extend from inside of said free field stress gauge to the outside of said free field stress gauge.

4. A free field stress gauge as defined in claim 3 wherein said cover disc is secured to said active disc by an epoxy cement.

5. A free field stress gauge for use in stress fields up to and including the kilobar range, comprising:
    an active disc having a plurality of elements, the density and modulus of said gauge being dependent upon the number of said plurality of elements and the material used to construct said gauge, said plurality of elements comprising a central column and a plurality of rings formed in one surface of said active disc, said central column and said plurality of rings being formed by cutting a plurality of grooves into said one surface of said active disc;
    a cover disc adapted to be secured to said active disc, comprising a plurality of rings formed in one surface of said cover disc by cutting grooves into said one surface of said cover disc, said central column and said rings of said active disc and said rings of said cover disc being so spaced relative to each other that said central column and said rings of said active disc extend into said grooves of said cover disc and said rings of said cover disc extend into said grooves of said active disc when said cover disc is secured to said active disc; and
    means for sensing any stress applied to said gauge, said means for sensing being mounted on said active disc.

6. A free field stress gauge as defined in claim 5 wherein said means for sensing any stress applied to said free field stress gauge comprises a plurality of strain sensors mounted on the central column of said active disc.

7. A free field stress gauge as defined in claim 6 wherein the number of said plurality of strain sensors is four, two of which sense longitudinal deformation and two of which sense circumferential deformation of the central column of said active free field stress gauge and wherein means are provided to electrically communicate with said four strain sensors from outside of said free field stress gauge.

8. A free field stress gauge as defined in claim 7 wherein said means to electrically communicate with said four strain sensors is a plurality of electrical conductors that extend from inside of said free field stress gauge to the outside of said free field stress gauge.

9. A free field stress gauge as defined in claim 8 wherein said cover disc is secured to said active disc by an epoxy cement.

* * * * *